US011411833B1

(12) United States Patent
Subramanian et al.

(10) Patent No.: US 11,411,833 B1
(45) Date of Patent: Aug. 9, 2022

(54) METHODS AND APPARATUS TO MODEL AND VERIFY A HYBRID NETWORK

(71) Applicant: VMware, Inc., Palo Alto, CA (US)

(72) Inventors: Giri Prashanth Subramanian, Cupertino, CA (US); Santhosh Prabhu Muraleedhara Prabhu, Champaign, IL (US); Ravi Singhal, Pune (IN); Atul Jadhav, Pune (IN); Rohit Reja, Pune (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/239,366

(22) Filed: Apr. 23, 2021

(51) Int. Cl.
*H04L 41/14* (2022.01)
*H04L 45/00* (2022.01)
*H04L 41/12* (2022.01)

(52) U.S. Cl.
CPC ............ *H04L 41/145* (2013.01); *H04L 41/12* (2013.01); *H04L 45/38* (2013.01)

(58) Field of Classification Search
CPC ....... H04L 41/145; H04L 41/12; H04L 45/38; H04L 41/0803
See application file for complete search history.

(56) References Cited

U.S. PATENT DOCUMENTS

| 9,225,601 | B2 | 12/2015 | Khurshid et al. | |
|---|---|---|---|---|
| 10,862,749 | B1 | 12/2020 | Kiyak et al. | |
| 2016/0036636 | A1* | 2/2016 | Erickson | H04L 41/145 370/248 |
| 2016/0359734 | A1* | 12/2016 | Liu | H04L 41/0686 |
| 2018/0367652 | A1* | 12/2018 | Dixit | H04L 41/12 |
| 2020/0280587 | A1* | 9/2020 | Janakiraman | H04L 41/12 |
| 2021/0204191 | A1* | 7/2021 | Peng | H04L 45/00 |

OTHER PUBLICATIONS

U.S. Patent and Trademark Office, "Systems for and Methods of Modelling, Analysis and Management of Data Networks", in connection with U.S. Appl. No. 15/683,650, filed Aug. 22, 2017.

* cited by examiner

*Primary Examiner* — Tonia L Dollinger
*Assistant Examiner* — Joseph M Cousins
(74) *Attorney, Agent, or Firm* — Hanley, Flight & Zimmerman, LLC

(57) ABSTRACT

Methods, apparatus, systems, and articles of manufacture are disclosed herein to formally verify a network with both physical and virtual components. The modeling and formal verification is performed by an apparatus comprising: a topology generator to generate a network model including a plurality of devices connected in a network; a flow modeler to add a rule to the network model, the rule to define a flow of network packets through the network model; a reduction mapper to identify the rules common to ones of the devices; and a mapping verifier to verify the network meets a user specification.

14 Claims, 12 Drawing Sheets

METHODS AND APPARATUS TO MODEL AND VERIFY A HYBRID NETWORK

FIELD OF THE DISCLOSURE

This disclosure relates generally to networking and, more particularly, to verification of networks combining physical and virtualized networking devices.

BACKGROUND

In traditional computer networks, data paths are implemented by interconnecting switches, routers, and other network devices. In recent years, however, there has been a rapid increase in the size of these networks. With that growth, the complexity of managing these networks has increased exponentially.

Many organizations have responded to this increased complexity by moving towards distributed and virtualized networking solutions. Network virtualization offers many advantages over the traditional networking infrastructure: lower maintenance cost, ease of segmentation, increased agility, and improved performance testing. In short, a virtualized network allows an organization to quickly change their network architecture in response to changing requirements.

Virtualized networking solutions are not used in isolation in their networks. In some systems, virtualized networks interact with existing physical infrastructure in a user's network.

Figure 6:
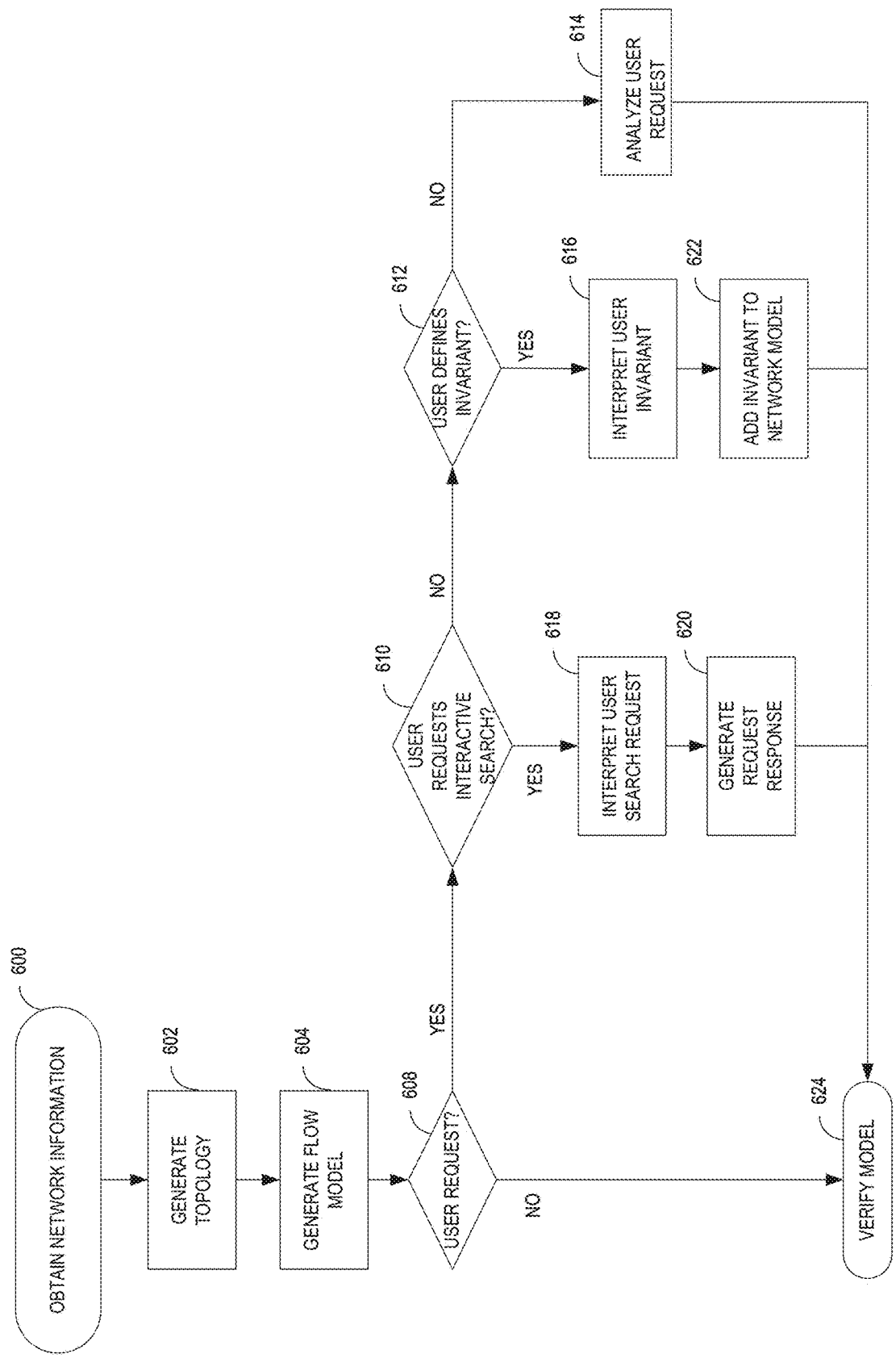
FIG. 6 is a flowchart of example procedures executed by the example network mapper of FIG. 3.
Figure 7:
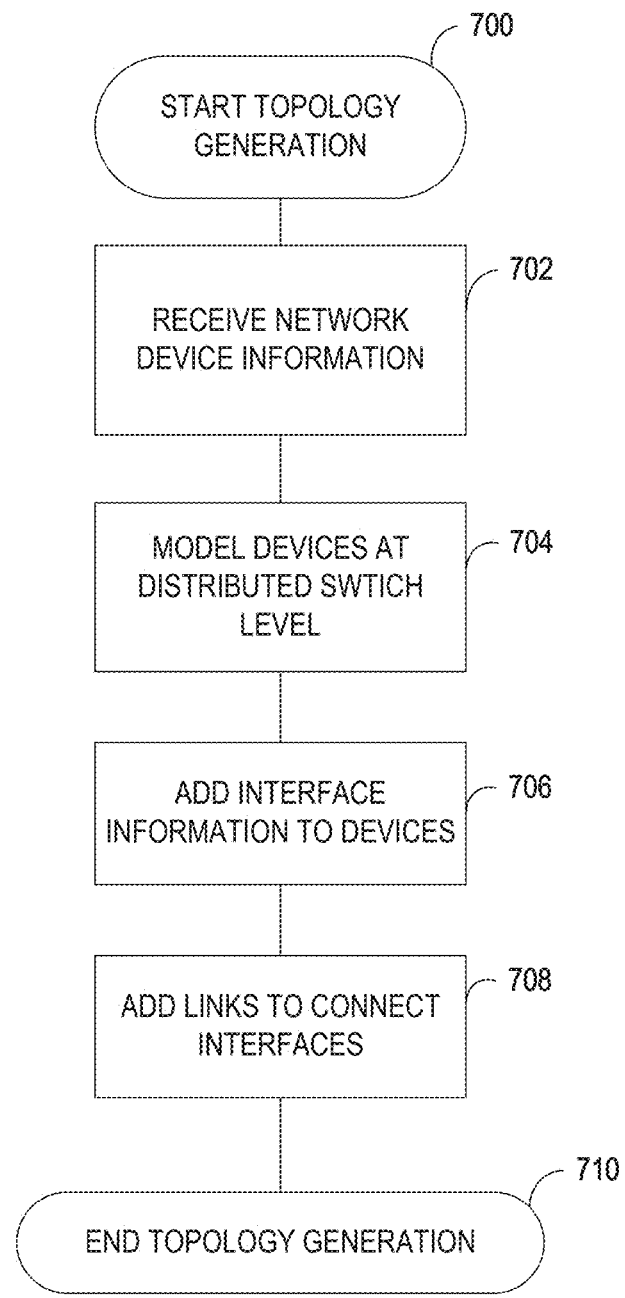
FIG. 7 is a flowchart of example procedures executed by the example topology generator of FIG. 3.
Figure 8:
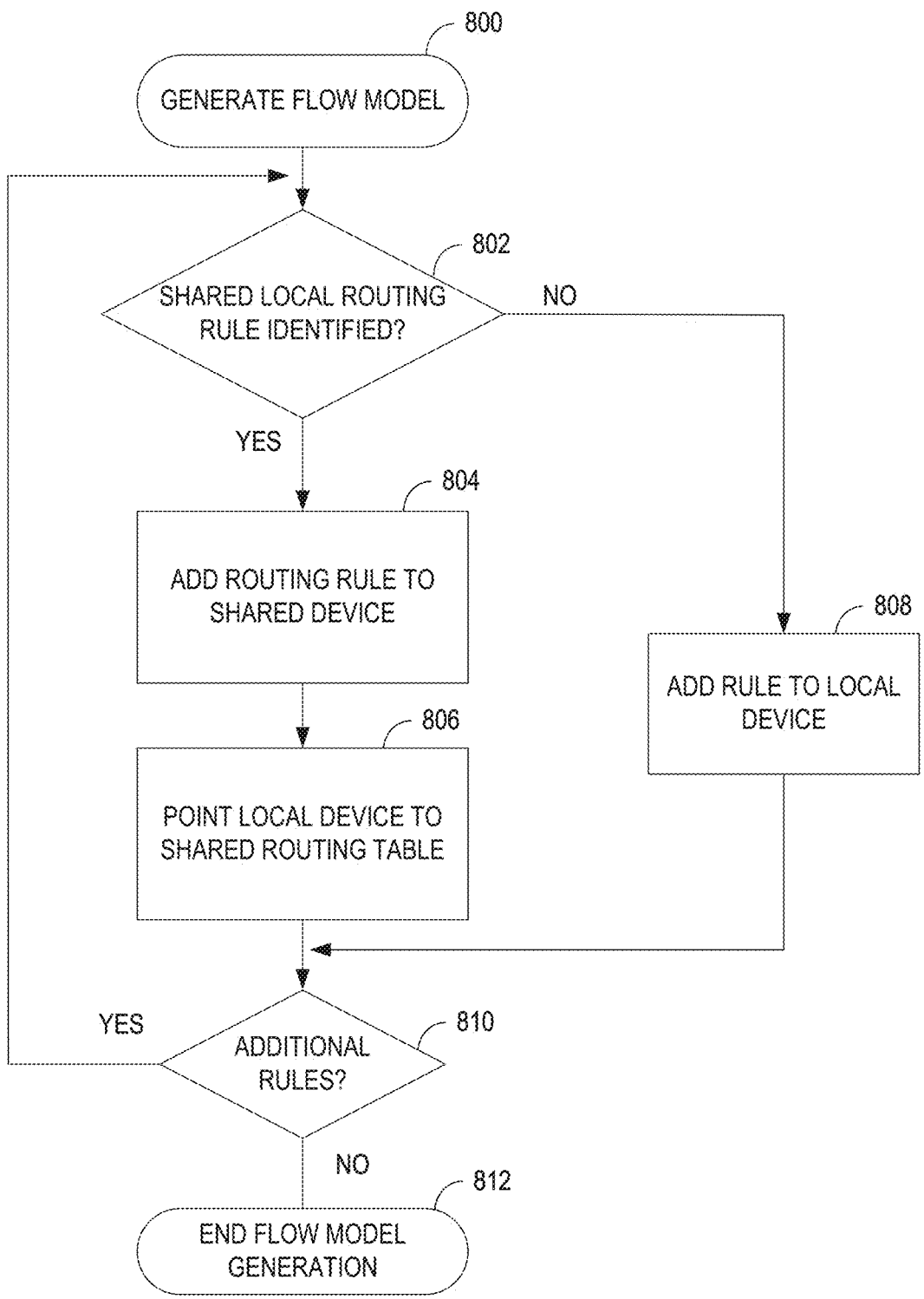
FIG. 8 is a flowchart of example procedures executed by the example flow modeler of FIG. 3.
Figure 12:
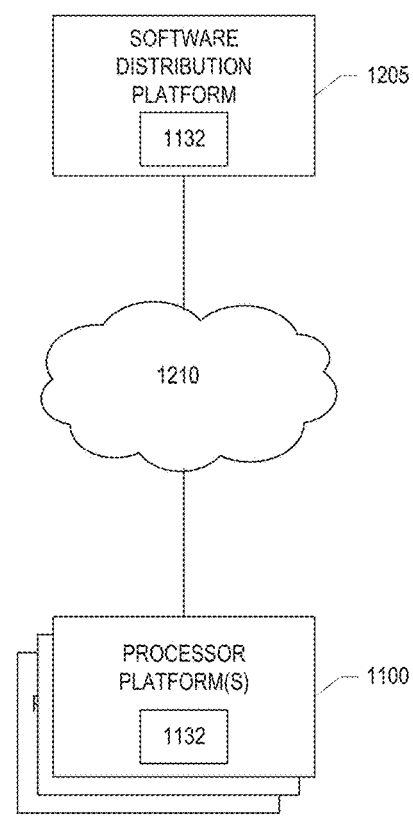

A block diagram illustrating an example software distribution platform to distribute software such as the example instructions of FIGS. 6-8 to third parties is illustrated in FIG. 12

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

A virtual machine is a software computer that, like a physical computer, runs an operating system and applications. An operating system installed on a virtual machine is referred to as a guest operating system. Because each virtual machine is an isolated computing environment, virtual machines (VMs) can be used as desktop or workstation environments, as testing environments, to consolidate server applications, etc. Virtual machines can run on hosts or clusters. The same host can run a plurality of VMs, for example.

A virtual network enables communication between multiple virtual machines or other devices. Virtual networks can replicate the functions of a physical network in software running on a host or cluster. These virtual components run on and interact with existing components in the user's physical network. Therefore, distributed and virtualized networking solutions are often used in combination with existing physical components. Example methods and apparatus disclosed herein allow hybrid networks, consisting of both physical and virtual components, to be modeled and verified.

Figure 1:
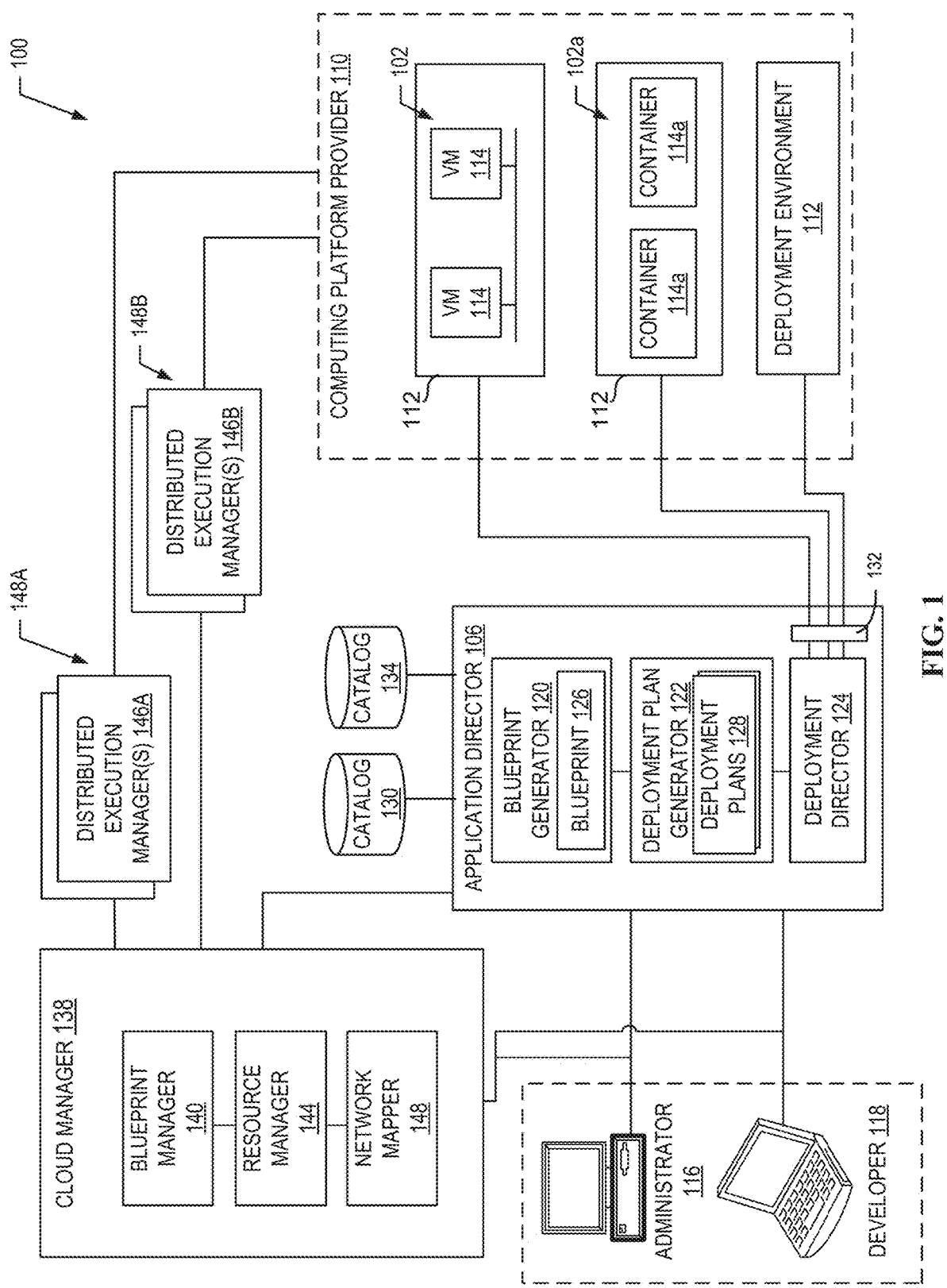
FIG. 1 is an illustration of an example system for managing a computing platform.

FIG. 1 is a block diagram of an example system 100 for implementing a virtualized environment. The example system 100 includes an application director 106 and a cloud manager 138 to manage a computing platform provider 110 as described in more detail below. As described herein, the example system 100 facilitates management of the provider 110 and does not include the provider 110. Alternatively, the system 100 can be included in the provider 110.

The computing platform provider 110 provisions virtual computing resources (e.g., virtual machines, or "VMs," 114) that may be accessed by users of the computing platform (e.g., users associated with an administrator 116 and/or a developer 118) and/or other programs, software, device. etc.

An example application 102 implemented via the computing platform provider 110 of FIG. 1 includes multiple VMs 114. The example VMs 114 of FIG. 1 provide different functions within the application 102 (e.g., services, portions of the application 102, etc.). One or more of the VMs 114 of the illustrated example are customized by an administrator 116 and/or a developer 118 of the application 102 relative to a stock or out-of-the-box (e.g., commonly available purchased copy) version of the services and/or application components. Additionally, the services executing on the example VMs 114 may have dependencies on other ones of the VMs 114.

As illustrated in FIG. 1, the example computing platform provider 110 may provide multiple deployment environments 112, for example, for development, testing, staging, and/or production of applications. The administrator 116, the developer 118, other programs, and/or other devices may access services from the computing platform provider 110, for example, via REST (Representational State Transfer) APIs (Application Programming Interface) and/or via any other client-server communication protocol. Example implementations of a REST API for cloud and/or other computing services include a vCloud Administrator Center™ (vCAC) and/or vRealize Automation™ (vRA) API and a vCloud Director™ API available from VMware, Inc. The example computing platform provider 110 provisions virtual computing resources (e.g., the VMs 114) to provide the deployment environments 112 in which the administrator 116 and/or the developer 118 can deploy multi-tier application(s). One particular example implementation of a deployment environment that may be used to implement the deployment environments 112 of FIG. 1 is vCloud DataCenter cloud computing services available from VMware, Inc.

In some examples disclosed herein, a lighter-weight virtualization is employed by using containers in place of the VMs 114 in the development environment 112. Example containers 114a are software constructs that run on top of a host operating system without the need for a hypervisor or a separate guest operating system. Unlike virtual machines, the containers 114a do not instantiate their own operating systems. Like virtual machines, the containers 114a are logically separate from one another. Numerous containers can run on a single computer, processor system and/or in the same development environment 112. Like virtual machines, the containers 114a can execute instances of applications or programs (e.g., an example application 102a) separate from application/program instances executed by the other containers in the same development environment 112.

The example application director 106 of FIG. 1, which may be running in one or more VMs, orchestrates deployment of multi-tier applications onto one of the example deployment environments 112. As illustrated in FIG. 1, the example application director 106 includes a blueprint generator 120, a deployment plan generator 122, and a deployment director 124.

The example blueprint generator 120 generates a basic blueprint 126 that specifies a logical topology of an application to be deployed. The example basic blueprint 126 generally captures the structure of an application as a collection of application components executing on virtual computing resources. For example, the basic blueprint 126 generated by the example blueprint generator 120 for an online store application may specify a web application (e.g., in the form of a Java web application archive or "WAR" file including dynamic web pages, static web pages, Java servlets, Java classes, and/or other property, configuration and/or resources files that make up a Java web application) executing on an application server (e.g., Apache Tomcat application server) that uses a database (e.g., MongoDB) as a data store. As used herein, the term "application" generally refers to a logical deployment unit, including one or more application packages and their dependent middleware and/or operating systems. Applications may be distributed across multiple VMs. Thus, in the example described above, the term "application" refers to the entire online store application, including application server and database components, rather than just the web application itself. In some instances, the application may include the underlying hardware and/or virtual computing hardware utilized to implement the components.

The example basic blueprint 126 of FIG. 1 may be assembled from items (e.g., templates) from a catalog 130, which is a listing of available virtual computing resources (e.g., VMs, networking, storage, etc.) that may be provisioned from the computing platform provider 110 and available application components (e.g., software services, scripts, code components, application-specific packages) that may be installed on the provisioned virtual computing resources. The example catalog 130 may be pre-populated and/or customized by an administrator 116 (e.g., IT (Information Technology) or system administrator) that enters in specifications, configurations, properties, and/or other details about items in the catalog 130. Based on the application, the example blueprints 126 may define one or more dependencies between application components to indicate an installation order of the application components during deployment. For example, since a load balancer usually cannot be configured until a web application is up and running, the developer 118 may specify a dependency from an Apache service to an application code package.

The example deployment plan generator 122 of the example application director 106 of FIG. 1 generates a deployment plan 128 based on the basic blueprint 126 that includes deployment settings for the basic blueprint 126 (e.g., virtual computing resources' cluster size, CPU, memory, networks, etc.) and an execution plan of tasks having a specified order in which virtual computing resources are provisioned and application components are installed, configured, and started. The example deployment plan 128 of FIG. 1 provides an IT administrator with a process-oriented view of the basic blueprint 126 that indicates discrete actions to be performed to deploy the application. Different deployment plans 128 may be generated from a single basic blueprint 126 to test prototypes (e.g., new application versions), to scale up and/or scale down deployments, and/or to deploy the application to different deployment environments 112 (e.g., testing, staging, production). The deployment plan 128 is separated and distributed as local deployment plans having a series of tasks to be executed by the VMs 114 provisioned from the deployment environment 112. Each VM 114 coordinates execution of each task with a centralized deployment module (e.g., the deployment director 124) to ensure that tasks are executed in an order that complies with dependencies specified in the application blueprint 126.

The example deployment director 124 of FIG. 1 executes the deployment plan 128 by communicating with the computing platform provider 110 via an interface 132 to provision and configure the VMs 114 in the deployment environment 112. The example interface 132 of FIG. 1 provides a communication abstraction layer by which the application director 106 may communicate with a heterogeneous mixture of provider 110 and deployment environments 112. The deployment director 124 provides each VM 114 with a series of tasks specific to the receiving VM 114 (herein referred to as a "local deployment plan"). Tasks are executed by the VMs 114 to install, configure, and/or start one or more application components. For example, a task may be a script that, when executed by a VM 114, causes the VM 114 to retrieve and install particular software packages from a central package repository 134. The example deployment director 124 coordinates with the VMs 114 to execute the tasks in an order that observes installation dependencies between VMs 114 according to the deployment plan 128. After the application has been deployed, the application director 106 may be utilized to monitor and/or modify (e.g., scale) the deployment.

The example manager 138 of FIG. 1 interacts with the components of the system 100 (e.g., the application director 106 and the provider 110) to facilitate the management of the resources of the provider 110. The example manager 138 includes a blueprint manager 140 to facilitate the creation and management of multi-machine blueprints, a resource manager 144 to reclaim unused cloud resources, and a network mapper 148 to be described in connection with FIGS. 2-12. The manager 138 may additionally include other components for managing a cloud environment.

The example blueprint manager 140 of the illustrated example manages the creation of multi-machine blueprints that define the attributes of multiple virtual machines as a single group that can be provisioned, deployed, managed, etc. as a single unit. For example, a multi-machine blueprint may include definitions for multiple basic blueprints that make up a service (e.g., an e-commerce provider that includes web servers, application servers, and database servers). A basic blueprint is a definition of policies (e.g., hardware policies, security policies, network policies, etc.) for a single machine (e.g., a single virtual machine such as a web server virtual machine and/or container). Accordingly, the blueprint manager 140 facilitates more efficient management of multiple virtual machines and/or containers than manually managing (e.g., deploying) basic blueprints individually.

The example blueprint manager 140 of FIG. 1 additionally annotates basic blueprints and/or multi-machine blueprints to control how workflows associated with the basic blueprints and/or multi-machine blueprints are executed. As used herein, a workflow is a series of actions and decisions to be executed in a virtual computing platform. The example system 100 includes first and second distributed execution manager(s) (DEM(s)) 146A and 146B to execute workflows. According to the illustrated example, the first DEM 146A includes a first set of characteristics and is physically located at a first location 148A. The second DEM 146B includes a second set of characteristics and is physically located at a second location 148B. The location and characteristics of a DEM may make that DEM more suitable for performing certain workflows. For example, a DEM may include hardware particularly suited for performance of certain tasks (e.g., high-end calculations), may be located in a desired area (e.g., for compliance with local laws that require certain operations to be physically performed within a country's boundaries), may specify a location or distance to other DEMS for selecting a nearby DEM (e.g., for reducing data transmission latency), etc. Thus, the example blueprint manager 140 annotates basic blueprints and/or multi-machine blueprints with capabilities that can be performed by a DEM that is labeled with the same or similar capabilities.

The resource manager 144 of the illustrated example facilitates recovery of computing resources of the provider 110 that are no longer being activity utilized. Automated reclamation may include identification, verification and/or reclamation of unused, underutilized, etc. resources to improve the efficiency of the running cloud infrastructure.

Figure 2:
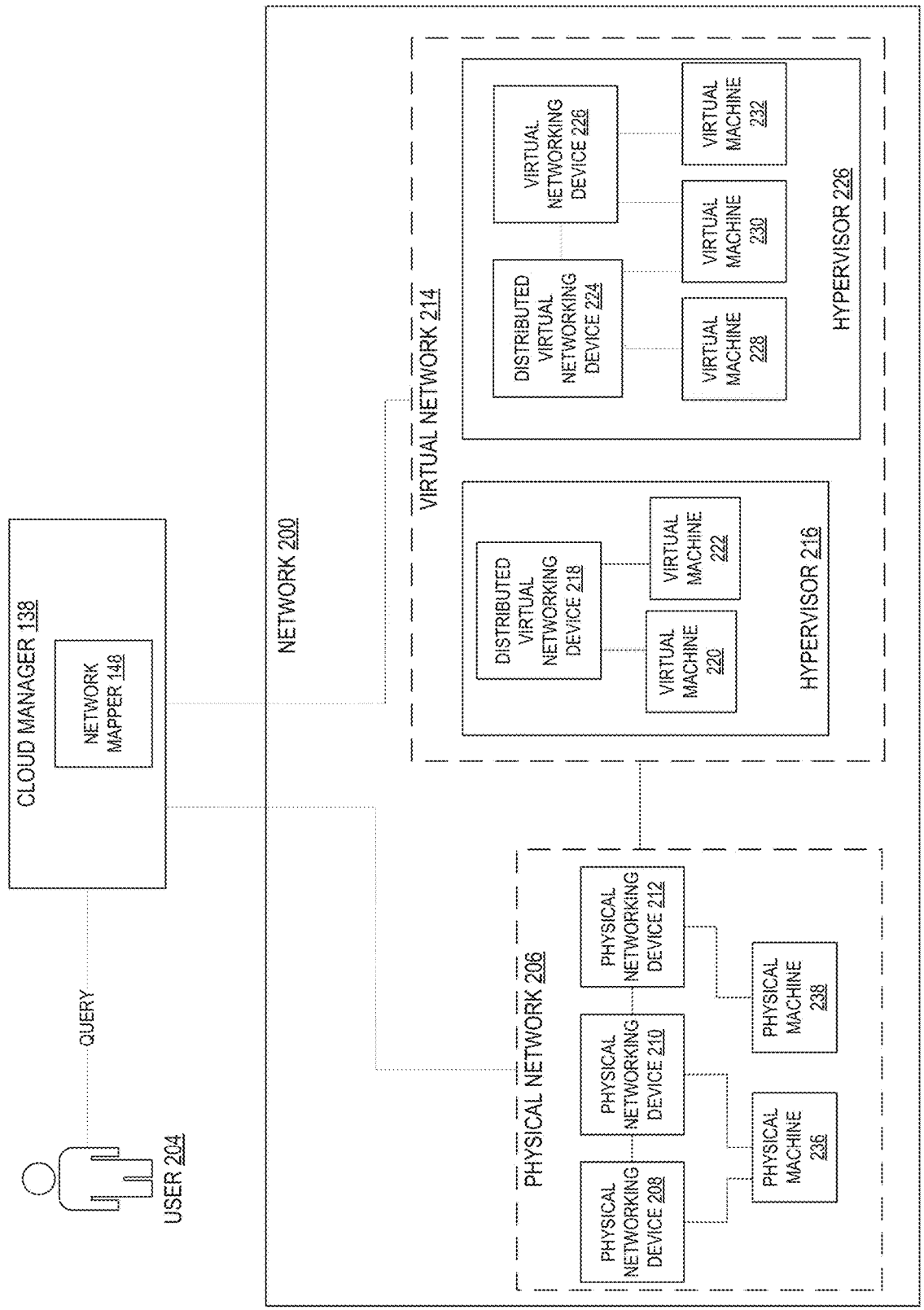
FIG. 2 illustrates an example system constructed in accordance with the teachings of this disclosure which manages an example hybrid network including both virtual and physical networks.

FIG. 2 illustrates an example cloud manager 138 in accordance with the teachings of this disclosure. The cloud manager 138 includes a network mapper 148, which manages an example hybrid physical/virtual network 200. FIG. 2 includes: a user 204; the cloud manager 138; the network mapper 148; a physical network 206; physical networking devices 208-212; a virtual network 214; virtual networking devices 218, 224, and 226; hypervisors 216 and 226; and virtual machines 220, 222, 228, 230, and 232.

To provide the user 204 with a network topology, the example network mapper 148 generates a model of the network 200. In this example, the network 200 consists of both the physical network 206 and the virtual network 214. The physical network 206 includes a plurality of physical networking devices 208-212. These physical networking devices 208-212 may be routers, switches, hubs, bridges, or other types of devices. The example physical network 206 also contains physical machines 236 and 238 with physical interfaces to the physical networking devices 208-212.

The example virtual network 214 may be operated on a cluster of servers. In other examples, the virtual network 214 may be operated on a single server. The example hypervisor manages virtual machines 220, 222, 228, 230, and 232. In some examples, the virtual machines replicate the functionality of a physical machine. In other examples, virtual machines such as the example virtual machine 220 may function as a software based hypervisor, allocating computing and networking resources to virtual network components.

In this example, the network consists of both the physical network 206 and the virtual network 214. In other examples, the network model may consist of one of a physical network or a virtual network.

Figure 3:
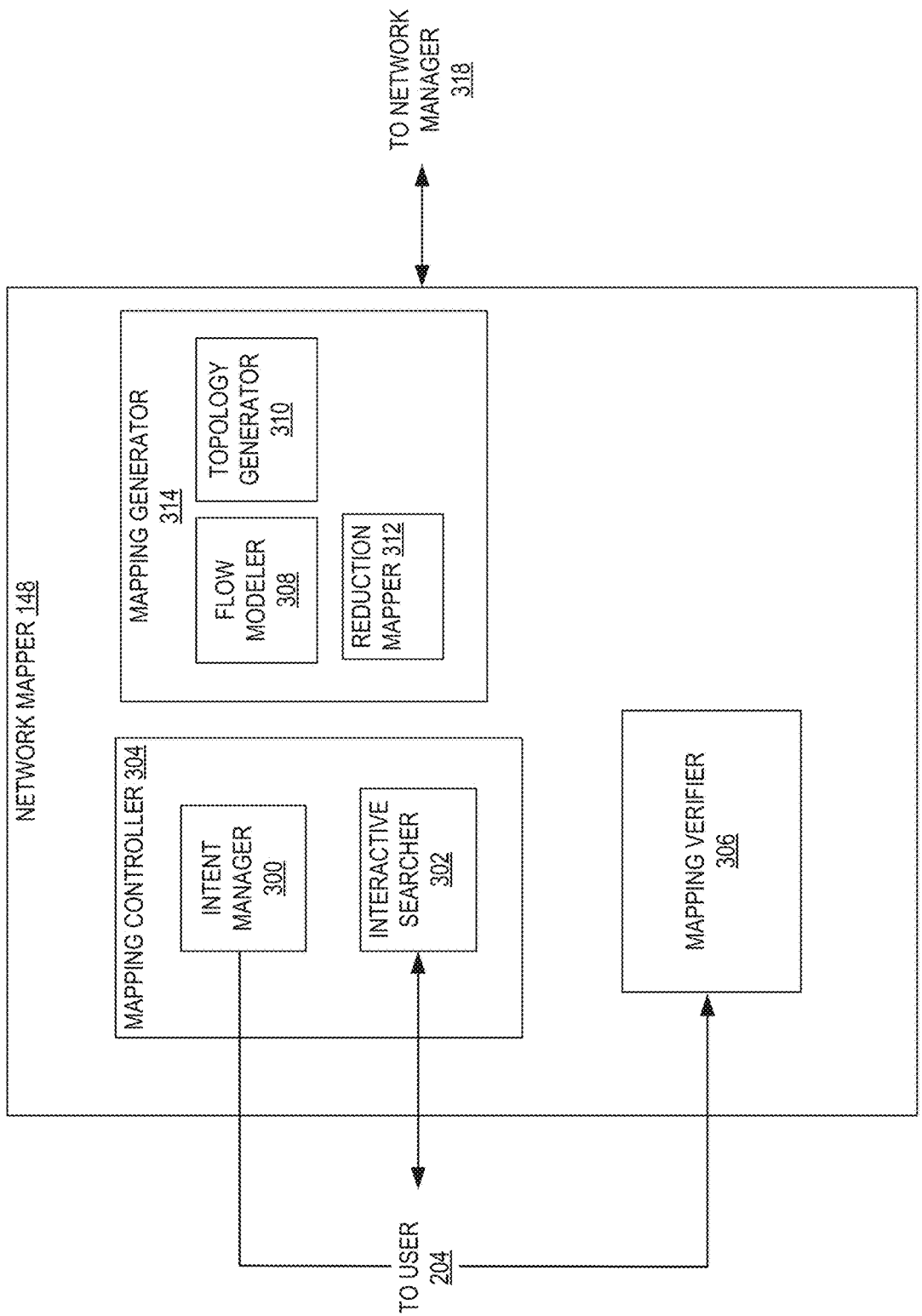
FIG. 3 is a block diagram of an example network mapper of the example cloud manager of FIG. 2.

FIG. 3 illustrates a block diagram of an example implementation of the network mapper 148 of FIG. 1. The example network mapper 148 includes an example mapping controller 304, an example mapping generator 314, and an example mapping verifier 306. In the examples described herein, the network mapper 148 interacts with the user 204 and a network manager 318.

To generate a model for the network mapper 148, the example mapping generator 314 includes an example topology generator 310, an example reduction mapper 312, and an example flow modeler 308.

Figure 4:
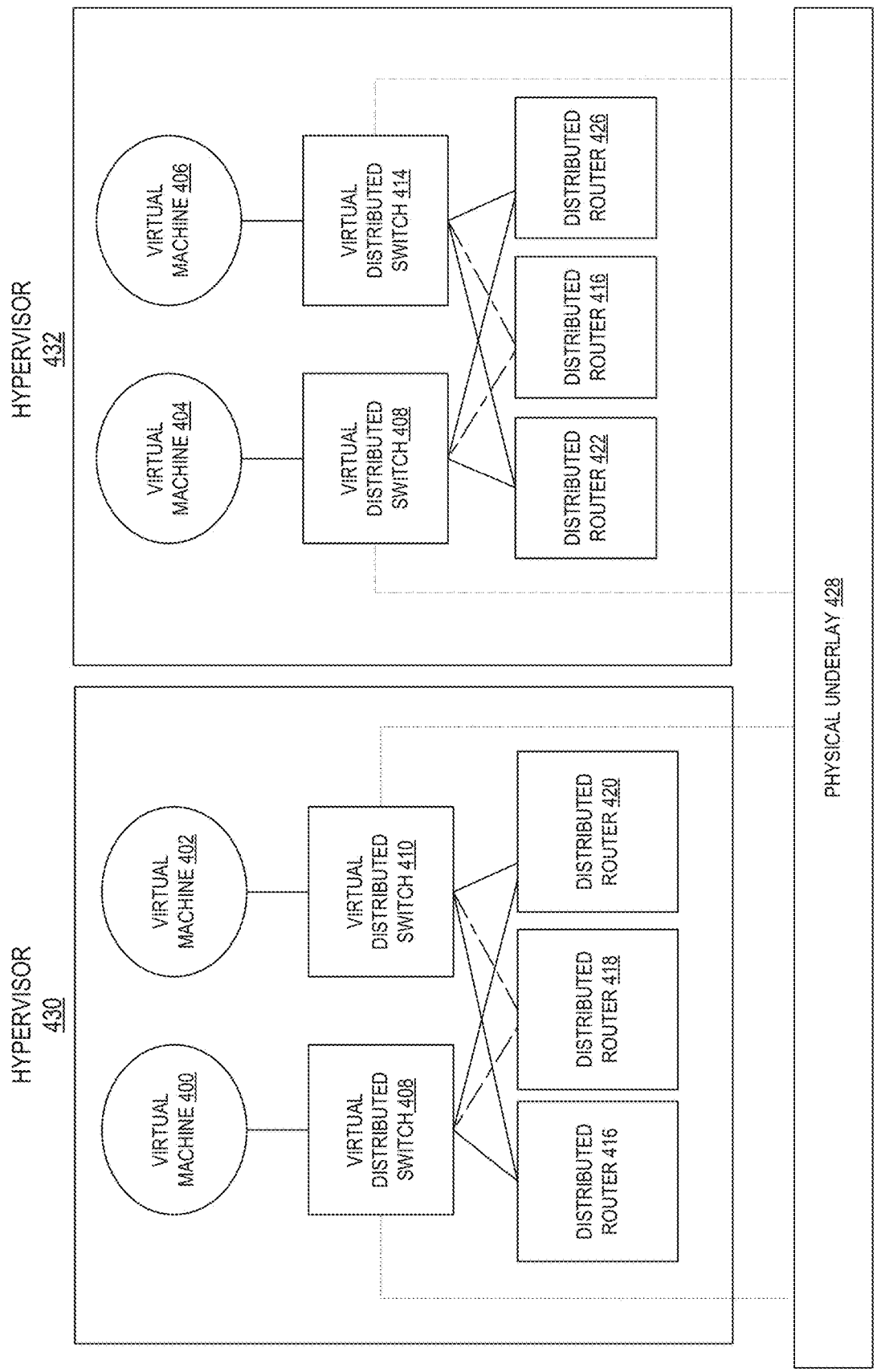
FIG. 4 is a block diagram of an example virtual network of the example system in FIG. 2.

The example topology generator 310 creates a model using information from the network manager 318. The model includes information corresponding to connections within the network. The example topology generator 310 generates a network topology from the information provided from the network manager 318. For example, a topology as illustrated in FIG. 4 may be generated by the topology generator 310 and modeled at a level corresponding to a distributed switch. Alternatively, the topology may be modeled at another level, such as a level corresponding to a logical switch.

The example flow modeler 308 populates the model created by the topology generator 310 with routing rules. The routing rules model the flow of packets through the model and allow user queries to be run on the model. Additionally, or alternatively, the rules may be stored in a separate routing database.

The example reduction mapper 312 analyzes the model for redundant rules. In this example, the reduction mapper 312 may create a shared device, wherein the shared device contains a rule that is shared by devices represented in the model. The reduction mapper 312 may remove redundant rules from the flow model and instruct local devices to reference the shared device for routing requests. In some examples, the model created by the mapping generator 314 is immediately used by the mapping controller 304. In other examples, the model is stored for later use.

To provide control functionality to the network mapper 148, the example mapping controller 304 receives instructions from the user 204. The instructions can include defining a network invariant. The network invariant is a rule which should not be violated. If the network invariant is violated, the user 204 is notified of the violation. For example, the network invariant may define a rule which maintains a persistent connection between the virtual machine 220 and the virtual machine 222 of FIG. 2.

The instructions may also include an interactive search. An interactive search uses the model generated by the mapping generator 314. This example model can be queried by the interactive searcher 302. The interactive searcher executes queries on the model and provides information to the user 204 from the result of the query.

To provide verification capabilities to the network mapper 148, the mapping verifier 306 verifies the validity of the network model. The mapping verifier 306 can be scheduled to periodically run a verification procedure. Additionally, or alternatively, the mapping verifier 306 can run in response to user instructions.

FIG. 4 is an illustration of a portion of an example topology which may be generated for the virtual network 214 of the example system as illustrated in FIG. 2. The example virtual network 214 includes virtual distributed switches 408-414, distributed routers 416-426, a physical underlay 428, and hypervisors 430-432.

The example physical underlay 428 provides computational and communication resources to the example hypervisors 430-432. In this example, the hypervisors 430-432 run directly on the physical underlay 428. In other examples, the hypervisors 430-432 could be run within an operating system that is running on the physical underlay 428.

The example hypervisor 430 includes the example virtual machines 400-402, the example virtual distributed switches 408-410, and the example distributed routers 416-420. In the example hypervisor 430, the virtual machine 400 connects to a virtual distributed switch 408. The example virtual distributed switch may provide a number of virtual networking capabilities to the virtual machine 400. In this example, when the user 204 of FIG. 2 creates a virtual distributed component, like the virtual distributed switch 408, an instance of that virtual switch is instantiated on each of the hypervisors that it lives on. In this example, the virtual distributed switch 408 is instantiated on both the hypervisor 430 and the hypervisor 432. The example virtual distributed switch 408 may provide tunneling and switching capabilities. Additionally, or alternatively, the virtual distributed switch 408 may include information to provide virtual firewall capabilities to the virtual network 214.

The example virtual distributed switches 408-414 connect to distributed routers 416 and 420. In this example, the distributed routers 416-426 provide route trafficking between the virtual switches 408-414. In other examples, the virtual routing capabilities may be handled by other virtual networking devices. The example virtual distributed switches 408-414 also connect directly to the physical underlay 428 via an interface which connects to a physical port on the hypervisor 430.

In some examples, a topology such as the example topology of FIG. 4 is surfaced to the user via the mapping controller 304 of FIG. 3. The interactive searcher 302 of FIG. 3 may model elements which are not actually tracked in an example network model created by the topology generator 310. For example, if the network model is stored in a database, having fewer elements in the model may save storage overhead or allow an interactive search to be performed more effectively.

Figure 5:
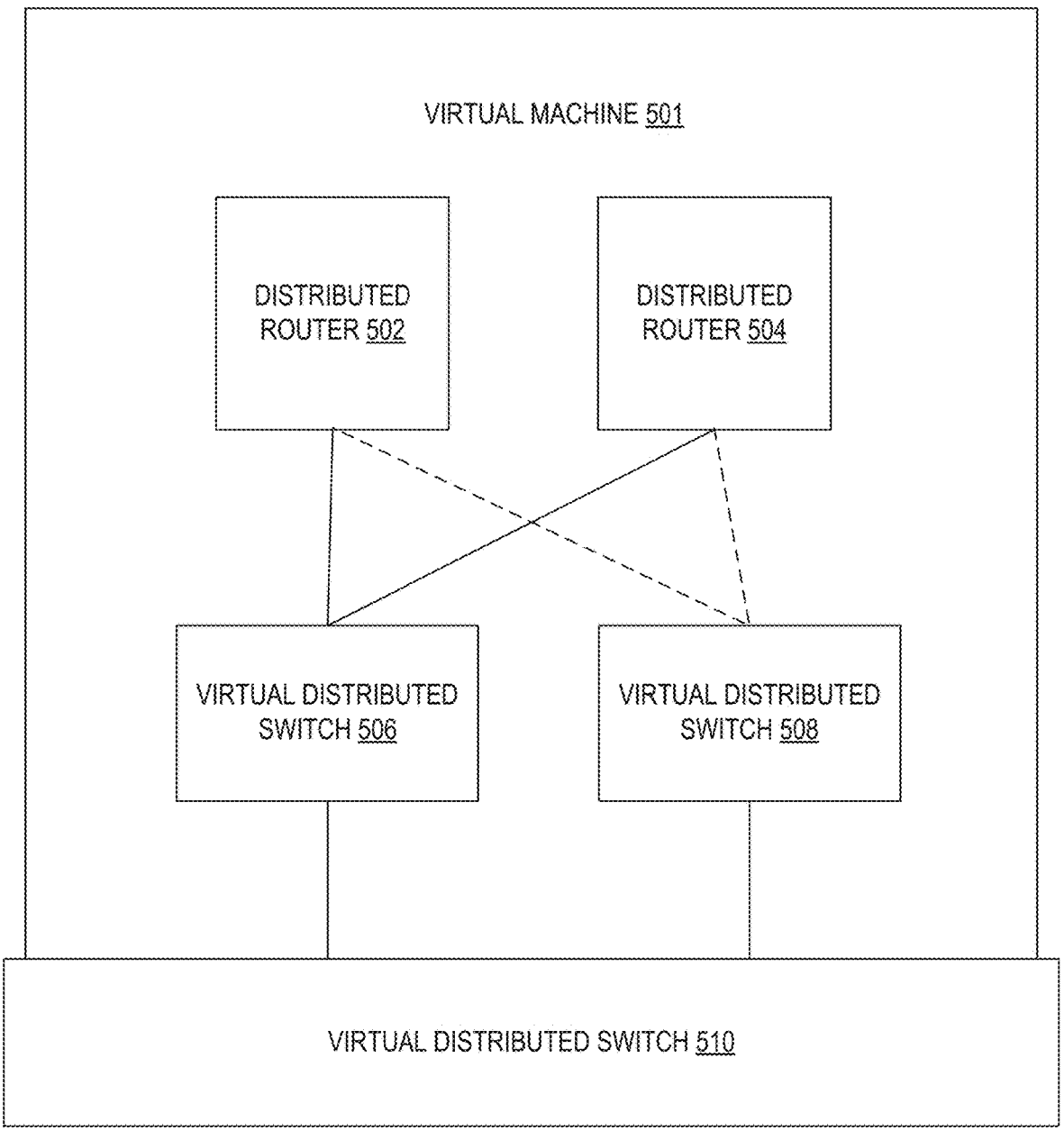
FIG. 5 is a block diagram of an example virtual machine of the example virtual network of FIG. 3.

FIG. 5 is a block diagram of an example virtual machine 400 of the example virtual network of FIG. 4. FIG. 5 illustrates that the virtual machine 400 may emulate portions of functionality of the example hypervisor 430. In some examples, a virtual machine that provides this functionality is referred to as an "edge virtual machine."

FIG. 6 is a flowchart of example procedures executed by the example network mapper 148. At block 600, the network mapper 148 first obtains network information from the network manager 318. At block 602, the mapping generator generates a topology. In some examples, the topology generated is at the distributed switch level. Alternatively, the topology may be generated at a network level, a controller level, a transport zone level, or at the level of a grouping of network devices.

The flow modeler 308 of FIG. 3 generates a flow model at block 604. The flow modeler 308 adds rules to the devices created by the topology generator 310 at block 602. These rules allow the topology to accurately model the flow of packets through the network 200 of FIG. 2. In this example, the reduction mapper 312 additionally aggregates shared rules into a shared device. The shared device allows redundant rules of the flow model to be reductively mapped into a shared device. The reduction mapping reduces the effective number of rules in the model, while still allowing accurately modeling of all possible flows of information through the network 200. In this example, the redundant local rules are never added to the local devices in the flow model. Instead, the local devices are pointed to the shared device with the shared rule. Alternatively, the flow modeler 308 may forego creating shared devices and add all rules to the corresponding devices in the flow model.

At block 608, the example network mapper 148 of FIGS. 1-3 has generated an example model of the network 200, including an example topology and flow model. The network mapper 148 then analyzes whether it has received a user request. If so, the network mapper 148 moves to block 610 to further interpret this request. If it did not, control moves to block 624 where a formal verification of the model may take place.

At block 610, the network mapper analyses if the user request from block 608 indicates a request for an interactive search. If it does, then control moves to block 618 where the request is interpreted. The interactive search allows the user 204 to understand the hybrid network 200. For example, the user could request the interactive searcher to show how a packet would be routed between two points in the network 200, without having those packets actually flow through the network 200. Without the topology and flow model generated by the network mapper 148, traditional methods for analyzing packet flow through the network 200 would fail, as the user 204 would not have a model of the virtual network.

At block 612, if an interactive search was not requested, the request is then analyzed to see if it defines a user invariant. The user invariant is a high level goal that the user 204 intends their network should not violate. For example, a user invariant may relate to redundancy goals, a security standard, or a segmentation standard. This invariant is added to the model in block 622. If no invariant is detected in block 612, control moves to block 614 where the request is further analyzed. For example, the analysis of block 614 could examine if an invalid user request was delivered to the mapping controller 304 by the user 204. At block 624, the example model is verified for consistency.

FIG. 7 is a flowchart of example procedures executed by the example topology generator 310 of FIG. 3. The topology generator 310 first receives network device information from the network manager 318 in block 702. This network information includes information about the example network 200, including information about the physical network 206 and the virtual network 214. As described in FIG. 6, the example model includes devices modeled at the distributed switch level. This can be seen at block 704 where distributed switches and routers are modeled in the topology as devices. However, to accurately model the network, additional information about local devices must also be tracked. In this example, this information is called an interface. In some examples, this information can describe a vNIC (an interface which connects VMs to logical switches), a pNIC (an interface that the distributed switch uses to connect to outside physical networking devices), a vmkNIC (interface used as a virtual tunnel endpoint on the distributed switches) or a routerInterface (connects logical routers to logical switches).

At block 706 the example topology generator 310 adds interface information to the topology. In this example, these interfaces are then connected together by links at block 708. The example model now consists of the devices, interfaces, and links that can model the switching, tunneling, routing, load balancing, and forwarding capabilities of the network 200 of FIG. 2.

FIG. 8 is a flowchart of example procedures executed by the flow modeler 308 and the reduction mapper 312 of FIG. 3. To add rules to the example topology, the reduction mapper 312 first analyzes the network information for shared rules at block 802. If a shared routing rule is identified, control moves to block 804 where a shared device is generated and populated with the shared routing rule. At block 806, the local device is pointed to the shared device, which in this example is stored in a shared routing table. If a shared rule is not identified in block 802, the rule 808 is added to the local device. At block 810, if it is determined that there are additional rules, control flows back to block 802.

Figure 9:
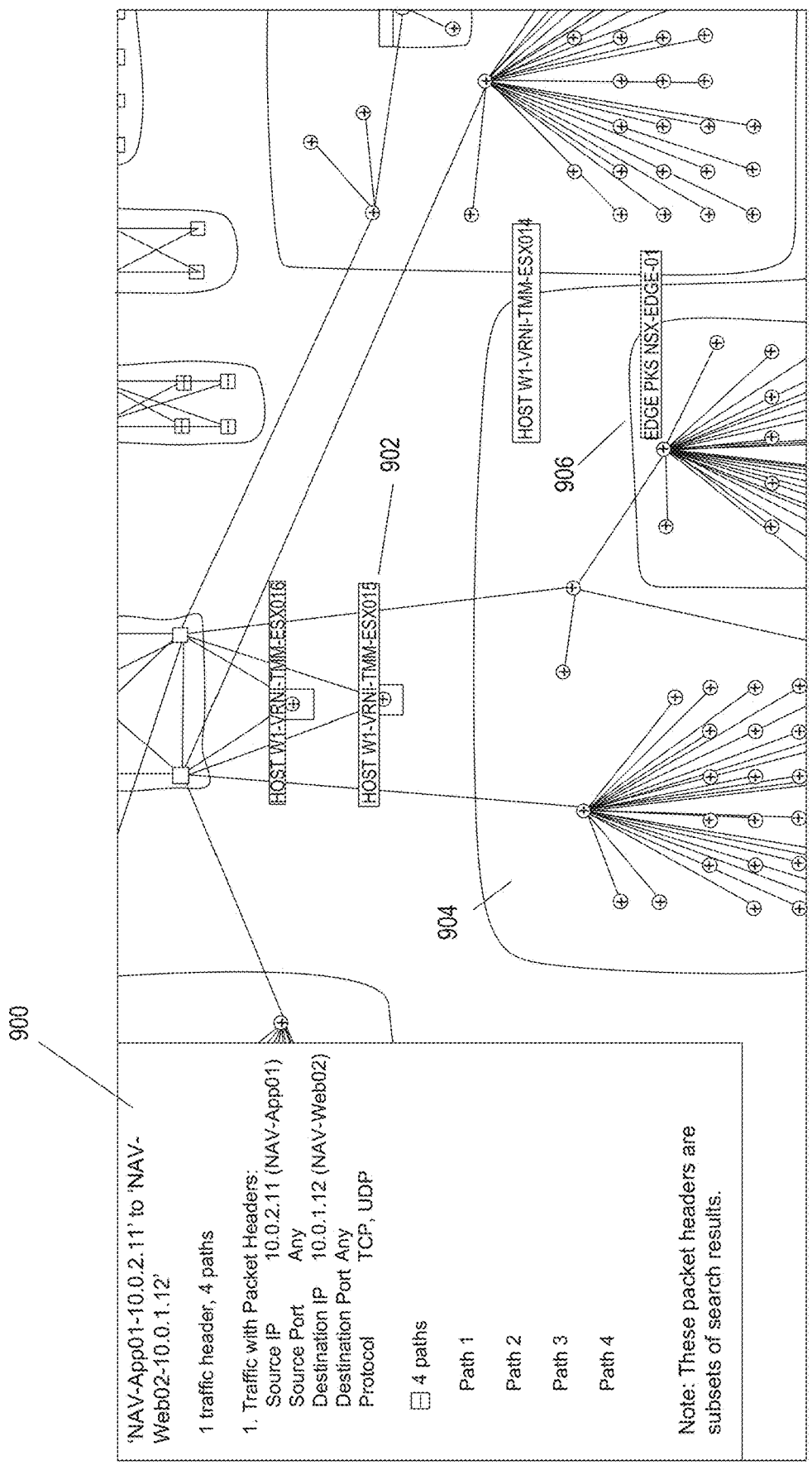
FIG. 9 is an example model generated by the example network mapper of FIG. 3.

FIG. 9 is an example path search which can be generated by the example network mapper of FIG. 3. In FIG. 9, a hypervisor 904, physical devices 902, edge VM 906, and path search results 900 are illustrated. As shared devices are transparent to the user, it appears that each of the local devices are responsible for the routing and switching information. However, the underlying model has been reduction mapped to improve the efficiency of the interactive search. In this example, the user has specified a source VM and a destination VM, which can be seen in the path search results 900.

Figure 10:
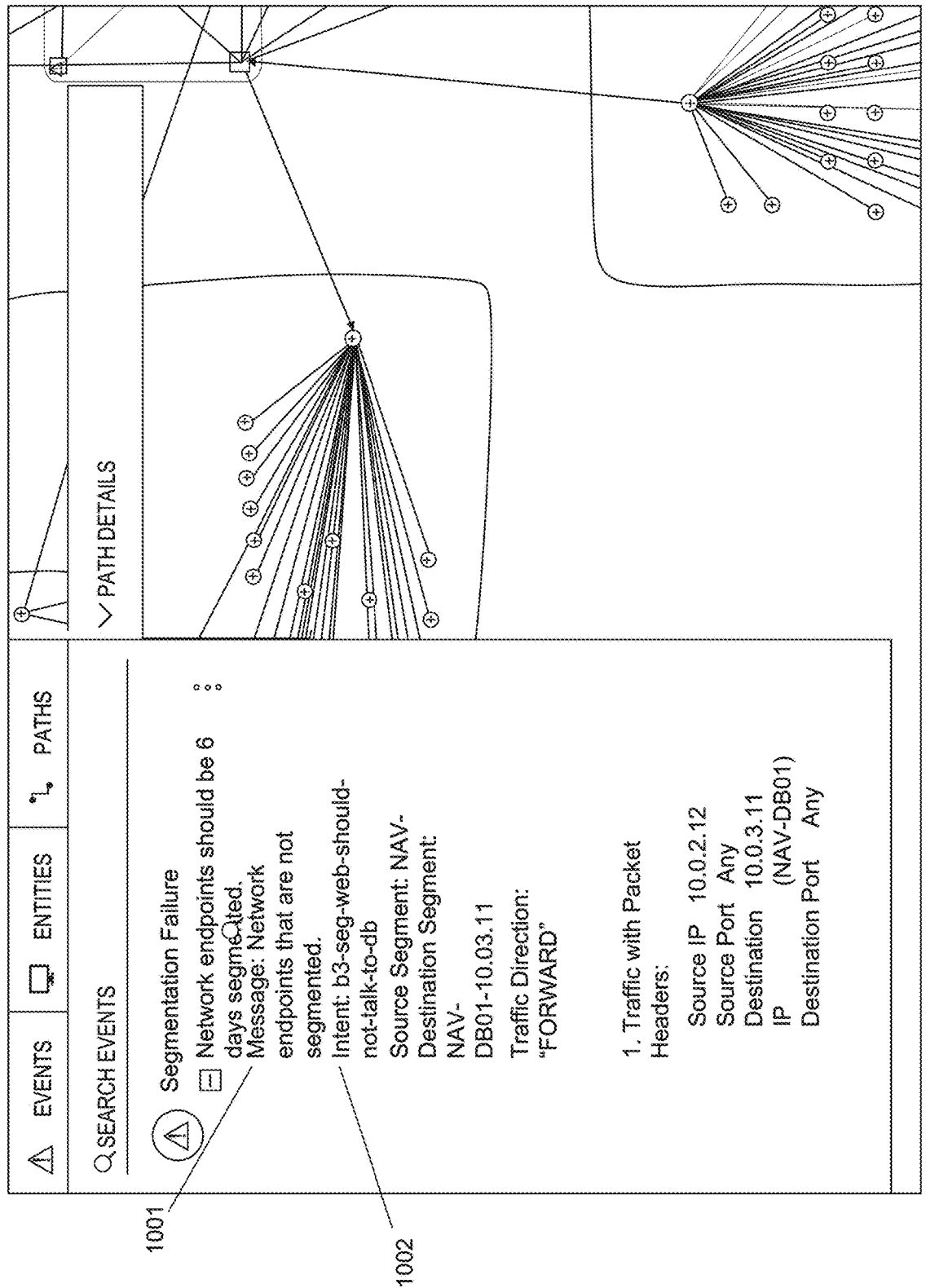
FIG. 10 is an example error screen generated by the example mapping verifier of FIG. 3 in response to a violation of a network invariant.

FIG. 10 is an example error screen generated by the mapping verifier 306 of FIG. 3 in response to violation of a network invariant. In this example, two virtual machines were to be separated. This directive can be seen in the intent 1002. In this example, the virtual machines were not separated, so a user, for example user 204, was notified of a segmentation failure. The user 204, now aware of the segmentation failure, may take actions to ensure the example network invariant is satisfied.

A flowchart representative of example hardware logic, machine readable instructions, hardware implemented state machines, and/or any combination thereof for implementing the network mapper 148 of FIGS. 1-3 is shown in FIGS. 6, 7, and 8. The machine readable instructions may be one or more executable programs or portion(s) of an executable program for execution by a computer processor and/or processor circuitry, such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowchart illustrated in FIGS. 6-8, many other methods of implementing the example network mapper 148 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 6-8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 11:
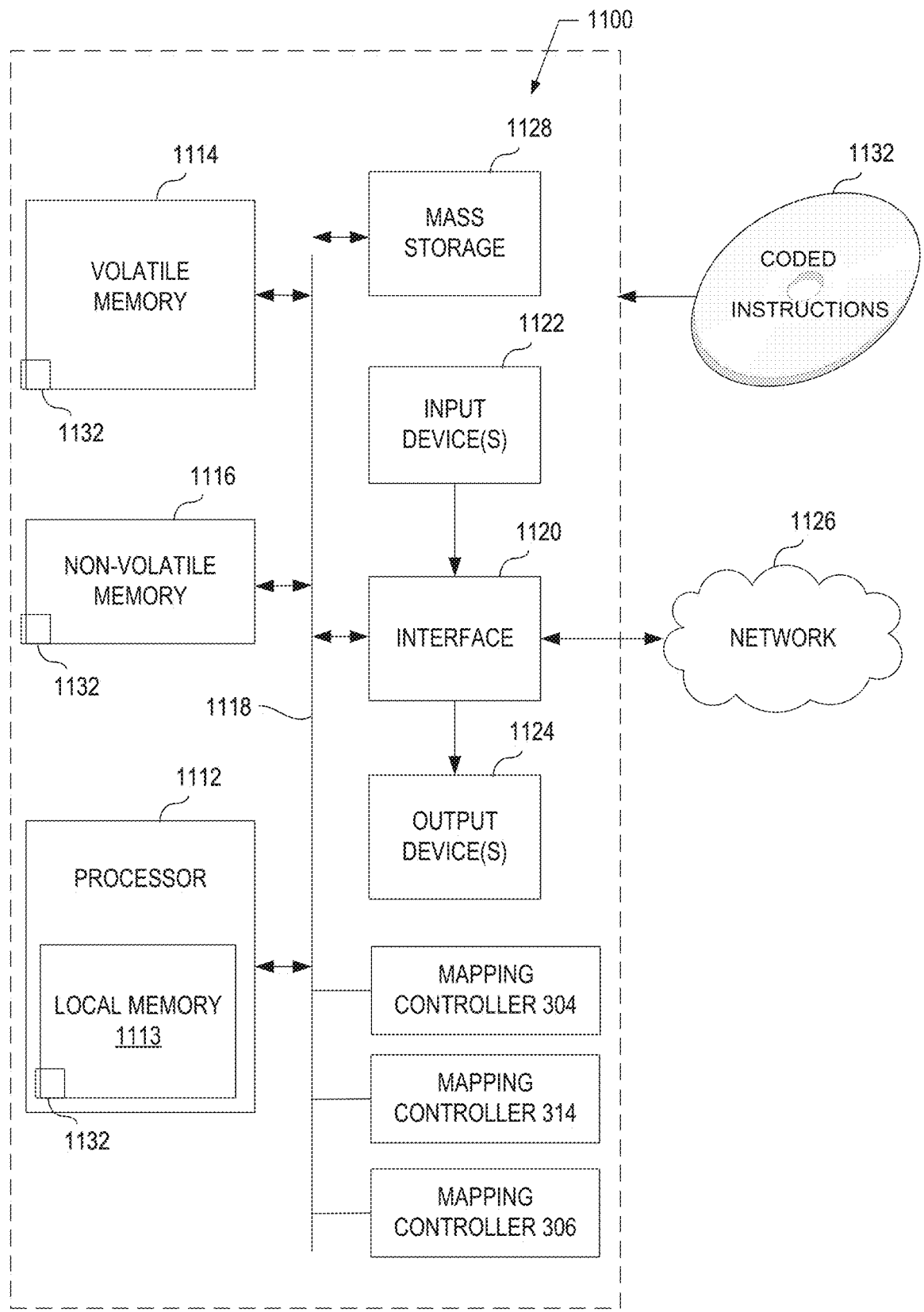
FIG. 11 is a block diagram of an example processor platform structured to execute the instructions of FIGS. 6-8 to implement the apparatus of FIG. 1-4.

FIG. 11 is a block diagram of an example processor platform 1100 structured to execute the instructions of FIGS. 6-8 to implement the apparatus of FIG. 1-4. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the mapping controller 304, the mapping generator 314, and the mapping verifier 306.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives.

The machine executable instructions 1132 of FIGS. 6-8 may be stored in the mass storage device 1128, in the volatile memory 1114, in the non-volatile memory 1116, and/or on a removable non-transitory computer readable storage medium such as a CD or DVD.

A block diagram illustrating an example software distribution platform 1205 to distribute software such as the example computer readable instructions of FIGS. 6-8 to third parties is illustrated in FIG. 12. The example software distribution platform 1205 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1232 of FIG. 12. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the computer readable instructions 1232, which may correspond to the example computer readable instructions of FIGS. 6-8, as described above. The one or more servers of the example software distribution platform 1205 are in communication with a network 1210, which may correspond to any one or more of the Internet and/or any of the example networks described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 1232 from the software distribution platform 1205. For example, the software, which may correspond to the example computer readable instructions 12 of FIG. 12 may be downloaded to the example processor platform 1100, which is to execute the computer readable instructions 1232 to implement the hybrid virtual network modeling and verification. In some example, one or more servers of the software distribution platform 1205 periodically offer, transmit, and/or force updates to the software (e.g., the example computer readable instructions 1132 of FIG. 11) to ensure improvements, patches, updates, etc. are distributed and applied to the software at the end user devices.

From the foregoing, it will be appreciated that example methods, apparatus and articles of manufacture have been disclosed that formally verify a hybrid network. The disclosed methods, apparatus and articles of manufacture improve the efficiency of using a computing device by allowing virtualized network functions be fully analyzed. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A method comprising:
   generating, by executing an instruction with processor circuitry, a model of a network including plurality of local devices and a shared device;
   adding, by executing an instruction with the processor circuitry, a rule to the model, the rule to define a flow of network packets through the model;
   identifying, by executing an instruction with the processor circuitry, rules common to the plurality of local devices and mapping the common rules to the shared device without adding the common rules to the plurality of local devices, the shared device associated with a shared routing table;
   linking, by executing an instruction with the processor circuitry, the plurality of local devices to the shared device to further define the flow of network packets based on an entry in the shared routing table; and
   verifying, by executing an instruction with the processor circuitry, the network meets a user specification.

2. The method of claim 1, wherein at least one of the plurality of local devices connected in the network is physical and one is digital.

3. The method of claim 1, wherein the user specification includes at least one of an invariant for the network or a search query for the network.

4. The method of claim 1, wherein the model includes a distributed switch, but does not include a logical switch.

5. The method of claim 1, wherein the model is changed based on a user input, and further including a second verification that the network meets the user specification.

6. A non-transitory computer readable storage medium comprising instructions which, when executed by processor circuitry, cause the processor circuitry to at least:
   generate a model of a network, the model including plurality of local devices and a shared device;
   add a rule to the model, the rule to define a flow of network packets through the model;
   identify rules common to the plurality of local devices and map the common rules to the shared device without adding the common rules to the plurality of local devices, the shared device associated with a shared routing table;
   link the plurality of local devices to the shared device to further define the flow of network packets based on an entry in the shared routing table; and
   verify the network meets a user specification.

7. The non-transitory computer readable storage medium of claim 6, wherein at least one of the plurality of local devices connected in the network is physical and one is digital.

8. The non-transitory computer readable storage medium of claim 6, wherein the user specification includes at least one of an invariant for the network or a search query for the network.

9. The non-transitory computer readable storage medium of claim 6, wherein the model includes a distributed switch, but does not include a logical switch.

10. An apparatus comprising:
    at least one memory;
    instructions in the apparatus; and
    a logic circuit to execute the instructions to:

generate a model of a network, the model including a plurality of local devices and a shared device;

add a rule to the model, the rule to define a flow of network packets through the model;

identify rules common to the plurality of local devices and map the common rules to the shared device without adding the common rules to the plurality of local devices, the shared device associated with a shared routing table;

link the plurality of local devices to the shared device to further define the flow of network packets based on an entry in the shared routing table; and verify the network meets a user specification.

11. The apparatus of claim 10, wherein at least one of the plurality of local devices connected in the network is physical and one is digital.

12. The apparatus of claim 10, wherein the user specification includes at least one of an invariant for the network or a search query for the network.

13. The apparatus of claim 10, wherein the model includes a distributed switch, but does not include a logical switch.

14. The apparatus of claim 10, wherein the logic circuit is to verify the network in response to at least one of a change to the network or a user input.

* * * * *